United States Patent [19]
Vrba et al.

[11] 3,818,143
[45] June 18, 1974

[54] SELF-STABILIZING MULTIPLEXING ARRANGEMENT

[75] Inventors: James J. Vrba, Berwyn; Charles K. Buedel, Wood Dale, both of Ill.

[73] Assignee: GTE Automatic Electric Laboratories Incorporated, Northlake, Ill.

[22] Filed: Jan. 2, 1973

[21] Appl. No.: 320,331

[52] U.S. Cl. ....... 179/15 A, 179/15 BA, 179/15 BL
[51] Int. Cl. ............ H04j 3/04
[58] Field of Search ......... 179/15 A, 15 BL, 15 BA; 340/413

[56] References Cited

UNITED STATES PATENTS

| | | | |
|---|---|---|---|
| 3,059,228 | 10/1962 | Beck | 179/15 A |
| 3,427,475 | 2/1969 | Wilkinson | 179/15 BL |
| 3,665,108 | 5/1972 | Bowers | 179/15 BL |

*Primary Examiner*—David L. Stewart
*Attorney, Agent, or Firm*—B. E. Franz

[57] ABSTRACT

A bi-stable multiplexing arrangement for gating selectively data signals under the control of a source of addressing signals to provide stabilized multiplexed data therefrom includes a first coincidence gating circuit enabled by the first one of the addressing signals and by one of the data signals, a second coincidence gating circuit enabled by a second one of the addressing signals and by another one of the data signals, an output alternative gating circuit enabled by the outputs of the first and second coincidence gating circuits, and a latching coincidence gating circuit enabled by the output of the alternative gating circuit and by a latching signal to cause the output of the alternative gating circuit to be latched in its present condition when the latching coincidence gating circuit is disabled and then enabled.

4 Claims, 2 Drawing Figures

SELF-STABILIZING MULTIPLEXING ARRANGEMENT

BACKGROUND OF THE INVENTION

1. Field of the Invention

This invention relates to a data multiplexing arrangement, and it more particularly relates to a self-stablizing data multiplexing arrangement for providing stabilized multiplexed data.

2. Description of the Prior Art

Data processing system multiplexing arrangements have been provided to supply on a time division multiplex basis a number of signals from a number of sources to a common signal lead. For this purpose, coincidence gating circuits have been enabled selectively by addressing signals, and the outputs of the coincidence gating circuits are connected through an alternative gating circuit to a single signal lead. Coincidence and alternative gating are defined as gating providing the AND function and OR function respectively. For certain applications, such as high-speed switching systems, the data at the output of the multiplexing arrangement is oftentimes required by the design of the system to be stable before the information can be utilized. In this regard, in order to avoid erroneously interpreting the output of the multiplexing arrangement, it is desirable to insure that the information has completely propagated through the gating circuits of the multiplexing arrangement and all switching transients have decayed before sensing the output information from the multiplexing arrangement. For the purpose of insuring that the data at the output of the multiplexing arrangement is stable, it has been proposed to provide a bi-stable circuit, such as a latch, to store the output signal bit from the multiplexing circuit to insure the stability of the data bit before utilizing it. However, such an arrangement is not entirely satisfactory for some applications in that such a bi-stable device must be provided for each bit to be multiplexed, and in the case of a bi-stable latch, two gate circuits must be provided for each multiplexed bit. Therefore, especially where a relatively large number of bits are to be multiplexed, it would be highly desirable to have a self-stabilizing multiplexing arrangement which does not require a special bi-stable device connected to the output of the multiplexing circuit for each data bit multiplexed therefrom, and thus to substantially reduce the number of circuits necessary to stabilize the multiplexed bits.

SUMMARY OF THE INVENTION

The object of this invention is to provide a new and improved multiplexing arrangement, which is self-stabilizing for stability purposes, and which is highly efficient in operation and employs a fewer number of gate circuits as compared to heretofore proposed arrangements.

According to the invention, there is provided a self-stabilizing multiplexing arrangement for gating data signals selectively under the control of a source of addressing signals, the arrangement including a first coincidence gating circuit enabled by a first one of the addressing signals and by one of the data signals, a second coincidence gating circuit enabled by a second one of the addressing signals and by another one of the data signals, an output alternative gating circuit enabled by the outputs of the first and second coincidence gating circuits, and a latching coincidence gating circuit enabled by the output of the alternative gating circuit and by a latching signal. In operation, a data signal is gated via one of the coincidence gating circuits when the addressing signal associated therewith selects it, and then the self-stabilizing multiplexing arrangement causes the data signal to be gated through the output alternative gating means when the latching signal becomes false to prevent the latching coincidence gating circuit from overriding the selected data signal. Thereafter, the latching signal becomes true to enable the latching gate to cause the signal appearing at the output of the alternative gating circuit to be latched if in a true state. Therefore, the output of the multiplexing arrangement of the present invention is latched automatically for stability purposes without the addition of a special buffering bi-stable device.

CROSS-REFERENCES TO RELATED APPLICATIONS

The preferred embodiment of the invention is incorporated in a communication register disclosed in U.S. patent application Ser. No. 320,412, filed the same day as the present application by the same inventors.

DESCRIPTION OF THE PREFERRED EMBODIMENT

Figure 1:
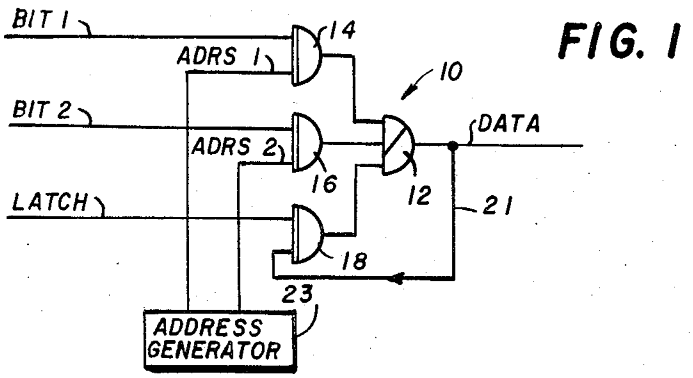
FIG. 1 is a functional block diagram of a self-stabilizing multiplexing arrangement constructed in accordance with the present invention.

Referring now to FIG. 1 of the drawings, there is shown a bi-stable multiplexing arrangement 10, which multiplexes a pair of data signals BIT 1 and BIT 2 to a common output lead designated DATA, and which is constructed in accordance with the present invention. The arrangement 10 includes an alternative OR gate 12 which generates the signal DATA and which has its three inputs connected to a pair of coincidence AND gates 14 and 16 for gating thereto the data signals BIT 1 and BIT 2, respectively, and a latching coincidence AND gate 18 which is enabled by a signal LATCH and by the signal DATA conveyed to the other input to the gate 18 via a lead 21 to cause the multiplexed signals to be latched automatically without the need for an extraneous bi-stable device to be latched automatically. An address generator 23 supplies enabling signals ADRS 1 and ADRS 2 to the respective AND gates 14 and 16 to enable them selectively for gating the corresponding bit signals to the gate 12. It should be understood that any number of bits, subject only to loading requirements well known in the art, may be multiplexed with the arrangement 10 of the present invention, whereby for each data bit signal coincidence AND gate is provided and is enabled by an associated address signal from the address generator 23. It should also be understood that the address generator 23 may either produce the addressing signals in a sequential manner, or in a selected random manner.

In operation, assuming that the signal ADRS 1 enables the gate 14 for gating the signal BIT 1 to the gate 12 and that the signal BIT 1 is true or a logic level 1, the gate 14 is enabled to cause the signal BIT 1 to propagate toward the gate 12. If the signal LATCH is false (logic level 0) to cause the output of the arrangement 10 to be unlatched, the signal LATCH being false does not prevent the output of the gate 18 from overriding the output of the gate 14, whereby the signal at the output of the gate 14 can propagate through the gate 12 to the lead DATA. Thereafter, the signal LATCH becomes true to latch the arrangement 10, and in the present example, the signal BIT 1 being a true signal causes the output signal DATA to become true and thus to cause the gate 18 to generate a true signal in response to the two true signals enabling it, whereby the arrangement 10 becomes latched in that condition since the gate 18 enables the gate 12 so long as the signal LATCH remains true. It should now be apparent that if the signal BIT 1 is a false or logic level 0 when the arrangement 10 is unlatched or reset by the signal LATCH becoming false, the signal DATA is false so that when the signal LATCH becomes true again for latching purposes, the output of the gate 18 is false so that as long as the signal BIT 1 is false the signal DATA at the output of gate 10 remains false. After the arrangement 10 is latched, the signal BIT 1, or in general, the enabled data bit signal, can be de-energized. the signal LATCH may be true to cause the arrangement to be latched when the gate 14 is first enabled, and in that case, the signal LATCH becomes false for sufficiently long period of time to insure that the enabled data bit signal propagates through the gate 12, and then becomes true to latch the output of the arrangement 10.

It should be understood that the logic circuits of the arrangement 10 may be implemented in any given type of logic circuitry so long as the circuits perform the logical functions illustrated and described.

Figure 2:
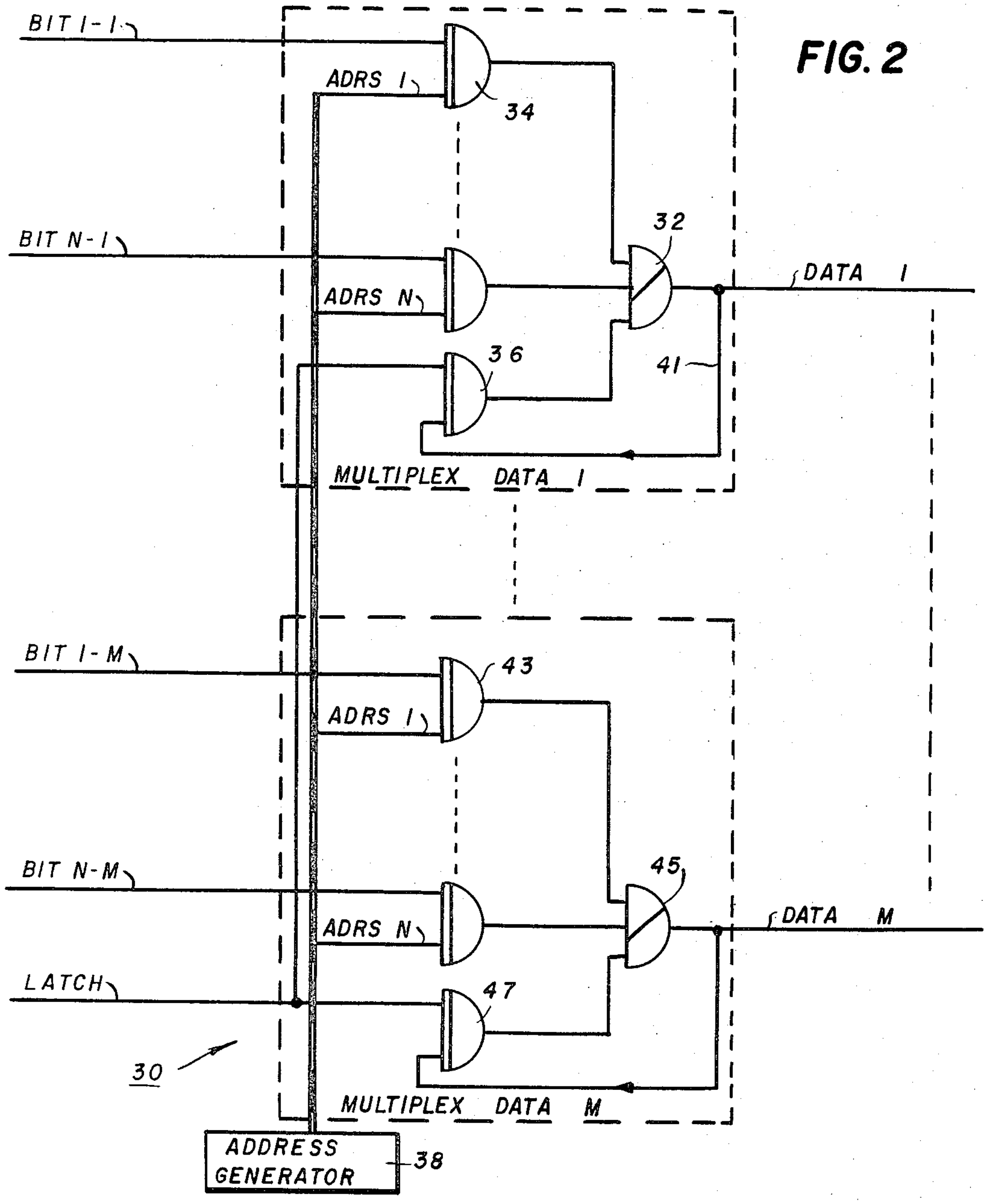
FIG. 2 is a functional block diagram of another self-stabilizing multiplexing arrangement constructed in accordance with the present invention for multiplexing a plurality of sets of data signals.

Referring now to FIG. 2 of the drawings, there is shown a bi-stable multiplexing arrangement 30 which multiplexes N number of sets of M number data signals, and which is constructed in accordance with the present invention. The arrangement 30 includes a plurality of multiplex data units 1 through M for generating the output signals DATA 1 through DATA M. Each one of the multiplex data units are similar to one another, and therefore only the multiplex data unit 1 will now be described. The unit MULTIPLEX DATA 1 includes an alternative OR gate 32 which generates the signal DATA 1, and which is enabled by any one of the N number of AND gates, such as the AND gate 34, or by a latching AND gate 36. The AND gates, such as the gate 34, are enabled by addressing signals ADRS 1 through ADRS N from the address generator 38, which also energized the corresponding AND gates for the other multiplex data units. The signals ADRS 1 through ADRS N gate the data signals BIT 1–1 through BIT N–1 to the gate 32. The latching gate 36 is enabled by the output of the gate 32 via a lead 41 and is enabled by a signal latch which also enables corresponding latching gates in the other multiplex data units simultaneously. Thus, when one of the addressing signals from the address generator 38 enables one of the AND gates of the multiplex data unit 1, it also enables all of the other corresponding AND gates of each one of the multiplex data units so that M number of signals DATA 1 through DATA M are multiplexed simultaneously. In operation, assuming that the signal BIT 1–1 is generated by a source of signals (not shown) and the signal ADRS 1 is generated by the address generator 38, the gate 34 of the multiplex data unit 1 is enabled, and all of the other corresponding AND gates, such as the AND gate 43 of the multiplex data unit M, are enabled to cause the gate 32 and the other corresponding OR gates, such as the OR gate 45 of the unit MULTIPLEX DATA M, to be enabled. As a result, the M number of data bit signals propagate through the arrangement 30. Either before or after the input data bit signals are presented to the multiplexing arrangement 30, the signal LATCH becomes false (logic level 0) to unlatch the multiplexing arrangement 30 to permit the data bit signals to be propagated entirely through the arrangement 30 in a manner similar to the arrangement 10. After sufficient time to permit such propagation, the signal LATCH becomes true to latch the M number of signals DATA 1 through DATA M. In this regard, when the signal LATCH becomes true, the gate 36 along with the other corresponding latching AND gates of the other multiplexing units, such as the AND gate 47 of the unit MULTIPLEX DATA M, are enabled in a manner similar to the latching gate 18 of the arrangement 10.

What is claimed is:

1. A self-stabilizing multiplexing arrangement for gating selectively data signals under the control of a source of addressing signals, said arrangement comprising:

first coincidence gating means enabled by coincidence of a first one of said addressing signals and by one of said data signals to produce an output;

second coincidence gating means enabled by coincidence of a second one of said addressing signals and by another one of said data signals to produce an output;

output alternative gating means enabled by the output of either said first coincidence gating means or by the output of said second coincidence gating means to produce an output;

latching coincidence gating means responsive to a latching signal; and means coupling the output of aaid alternative gating means to an input to said latching gating means to cause said data signals to be latched when said latching signal deactivates and then activates said latching means.

2. A self-stabilizing multiplexing arrangement according to claim 1, wherein said means coupling the output of said alternative gating means to an input to said latching means comprises a direct connection therebetween.

3. A self-stabilizing multiplexing arrangement according to claim 1, further including a second alternative gating means, third coincidence gating means being enabled by coincidence of said one of said addressing signals and by a third data signal to produce an output of enabling said second alternative gating means, fourth coincidence gating means being enabled by coincidence of said another one of said addressing signals and by a fourth data signal to produce an output for enabling said second alternative gating means, second latching coincidence gating means being responsive to said latching signal, second means coupling the output of said second alternative gating means to an input to said second latching means to cause said third and fourth data signals to be latched when said latching signal de-activates and then activates said second latching means.

4. A self-stabilizing multiplexing arrangement according to claim 3, wherein each one of the first-mentioned and said second means coupling the output of alternative gating means comprises a direct connection.

* * * * *